United States Patent
Lee (10) Patent No.: US 8,324,767 B2
(45) Date of Patent: Dec. 4, 2012

(54) STRUCTURE INCLUDING SPINDLE MOTOR AND PRINTED CIRCUIT BOARD

(75) Inventor: Myung Seok Lee, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 367 days.

(21) Appl. No.: 12/640,422

(22) Filed: Dec. 17, 2009

(65) Prior Publication Data

US 2010/0148639 A1 Jun. 17, 2010

(30) Foreign Application Priority Data

Dec. 17, 2008 (KR) .......................... 10-2008-0128659

(51) Int. Cl.
*H02K 7/00* (2006.01)

(52) U.S. Cl. .................. 310/67 R; 310/68 B; 310/68 D; 360/98.07; 360/99.01; 360/99.04; 360/99.08

(58) Field of Classification Search ................ 310/67 R, 310/68 B, 68 D; 360/98.07, 99.01, 99.04, 360/99.08; 720/695, 696
See application file for complete search history.

(56) References Cited

U.S. PATENT DOCUMENTS

| 5,461,523 | A | * | 10/1995 | Hoshi | ........................ | 360/99.12 |
| 7,023,116 | B2 | * | 4/2006 | Kuribara | ........................ | 310/90 |
| 2004/0061404 | A1 | * | 4/2004 | Fujii et al. | ..................... | 310/216 |
| 2007/0133123 | A1 | * | 6/2007 | Ichizaki | ..................... | 360/99.05 |
| 2008/0079325 | A1 | * | 4/2008 | Yamada et al. | ............. | 310/67 R |

* cited by examiner

*Primary Examiner* — Quyen Leung
*Assistant Examiner* — Leda Pham
(74) *Attorney, Agent, or Firm* — Saliwanchik, Lloyd & Eisenschenk (57) ABSTRACT

A spindle motor structure is disclosed having a structure incorporating a spindle motor, a driving substrate, and a base on which the spindle motor and the driving substrate are installed. The spindle motor includes a stator having a core wound with a coil and a rotor rotating about the stator. The driving substrate is aligned at an outer periphery of the rotor and soldered with driving control parts of the spindle motor including a plurality of circuit parts including a driving integrated circuit and the like. The spindle motor is assembled with or dissembled from the base independently from the driving substrate.

17 Claims, 6 Drawing Sheets

STRUCTURE INCLUDING SPINDLE MOTOR AND PRINTED CIRCUIT BOARD

CROSS-REFERENCE TO RELATED APPLICATION

This application claims the benefit under 35 U.S.C. §119 of Korean Application No. 10-2008-0128659, filed Dec. 17, 2008, which is hereby incorporated by reference in its entirety.

BACKGROUND

The present disclosure relates to a structure including a spindle motor and a printed circuit board. An optical device is a device optically inputting data into an optical disk and outputting data from the optical disk, where the optical device includes an optical pickup accessing data of the optical disk, a spindle motor rotating the optical disk and a feeding motor moving the optical pickup toward inner and outer peripheries of the optical disk. A spindle motor performs the function of rotating a disk to enable an optical pickup which linearly reciprocates in an optical disk drive (ODD) to read data recorded on the disk. A spindle motor structure defines an assembled structure including a spindle motor and a printed circuit board driving the spindle motor.

BRIEF SUMMARY

The present disclosure intends to provide a spindle motor structure capable of easily coupling and separating a spindle motor from a printed circuit board.

The spindle motor structure according to one aspect of the present disclosure comprises: a spindle motor including a stator having a core wound with a coil and a rotor rotating about the stator; and a driving substrate aligned at an outer periphery of the rotor and soldered with driving control parts of the spindle motor including a plurality of circuit parts including a driving integrated circuit and the like; and a base on which the spindle motor and the driving substrate are installed, wherein the spindle motor is assembled with or dissembled from the base independently from the driving substrate.

The spindle motor structure according to another aspect of the present disclosure comprises: a spindle motor including a stator having a core wound with a coil and a rotor rotating about the stator; a driving substrate aligned at an outer periphery of the rotor and soldered with driving control parts of the spindle motor including a plurality of circuit parts including a driving integrated circuit and the like; a core substrate aligned at an inner side of the rotor and installed with the core and to which the coil is soldered and connected to the driving substrate; and a base on which the spindle motor, the driving substrate and the core substrate are installed, wherein the spindle motor or the core substrate is assembled with or dissembled from the base independently from the driving substrate.

DETAILED DESCRIPTION

Figure 1:
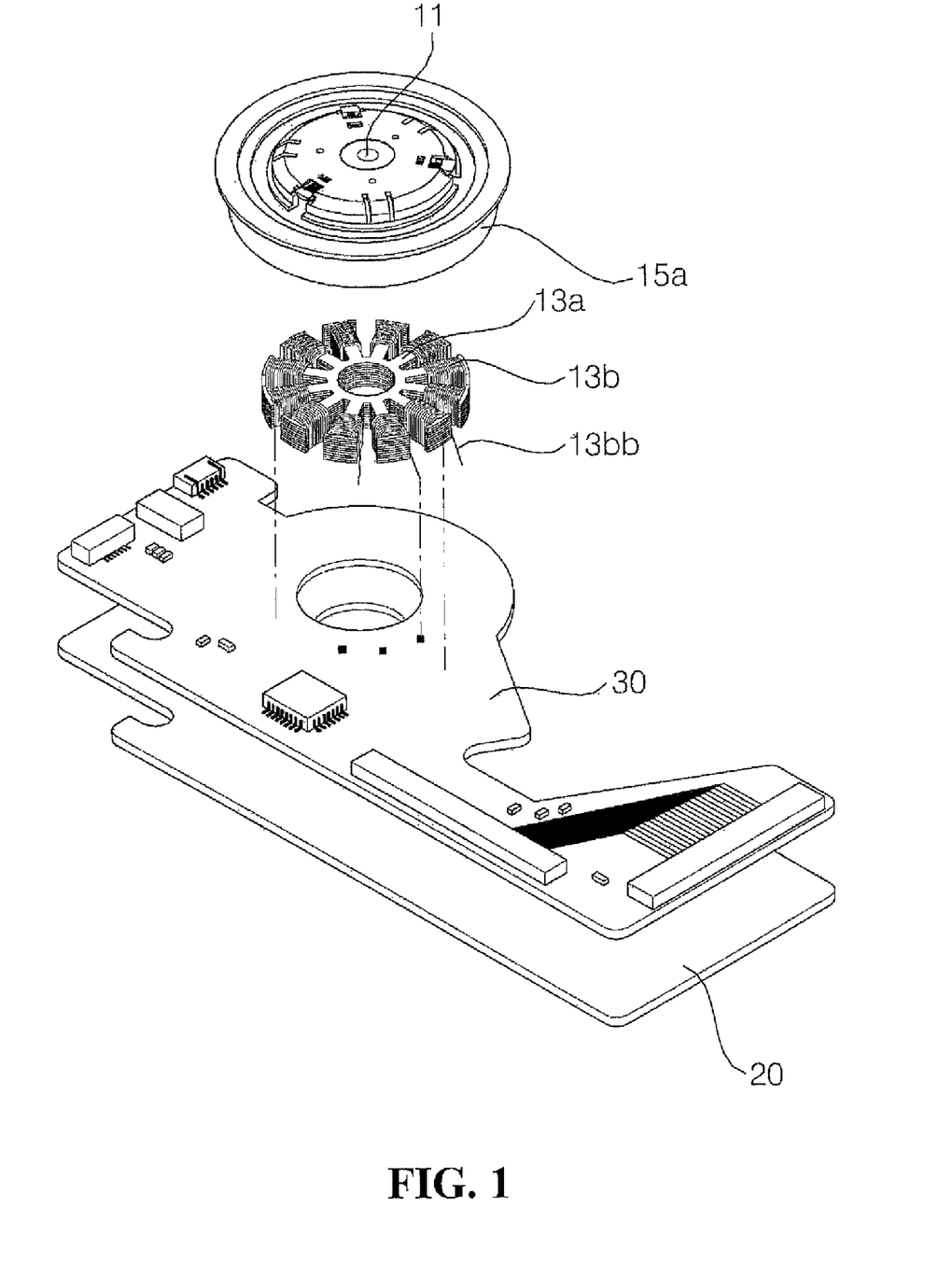
FIG. 1 is a perspective view illustrating an imaginary comparative exemplary embodiment for comparing with exemplary embodiments of the present disclosure.

FIG. 1 is a perspective view illustrating an imaginary comparative exemplary embodiment for comparing with exemplary embodiments of the present disclosure, where an assembled structure of a spindle motor and a printed circuit board is shown.

Referring to FIG. 1, a spindle motor is formed with a bearing housing (not shown) press-fitted by a bearing (not shown), and the bearing is supportively and rotatably installed by a lower portion of the rotation shaft 11.

A stator including a core 13a and a coil 13b is coupled to an outer periphery of the bearing housing, and a rotor including a rotor yoke 15a and a magnet (not shown) is coupled to an outer periphery at an upper side of the rotation shaft 11.

The bearing housing is vertically installed with a metallic base 20 on which a printed circuit board (substrate 30) mounted with a plurality of parts is installed.

The substrate 30 is connected with a lead wire 13bb of the coil 13b by way of soldering and is supportively soldered by one side of the core 13a. The substrate 30 also serves to insulate the coil 13b and the base 20. If the substrate 30 fails to insulate the coil 13b and the base 20, a separate insulator may be installed.

The spindle motor structure as illustrated in FIG. 1 is coupled by the stator at an area of the substrate 30 at an inner side of the rotor yoke 15a, whereby it makes it difficult to separate the substrate 30 from the spindle motor 10 in a case the substrate 30 is to be replaced for changing the characteristic of the spindle motor 10 or for being compatible with the product side.

Another drawback is that the stator is coupled at an area of the substrate 30 inside the rotor yoke 15a, which makes it difficult to perform the coupling process of the spindle motor 10 and the substrate 30.

Thus, the present disclosure intends to solve the aforementioned conventional drawbacks and exemplary embodiments of the present disclosure to improve the drawbacks will be described in the following.

Figure 2:
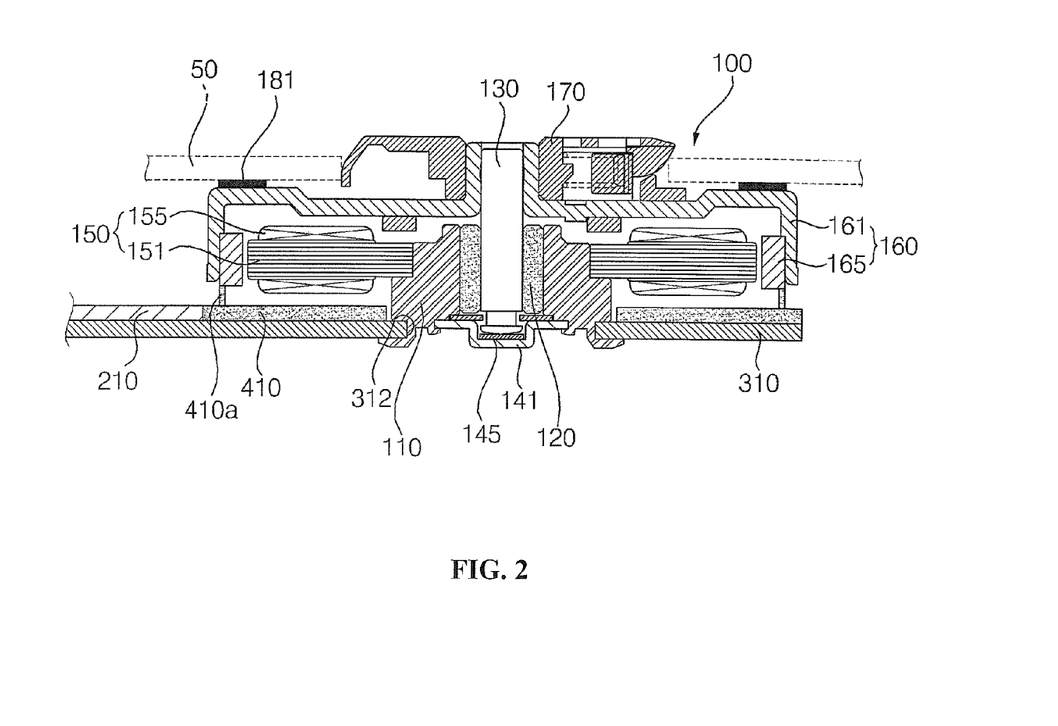
FIG. 2 is a cross-sectional view illustrating a spindle motor and a printed circuit board according to a first exemplary embodiment of the present disclosure.
Figure 3:
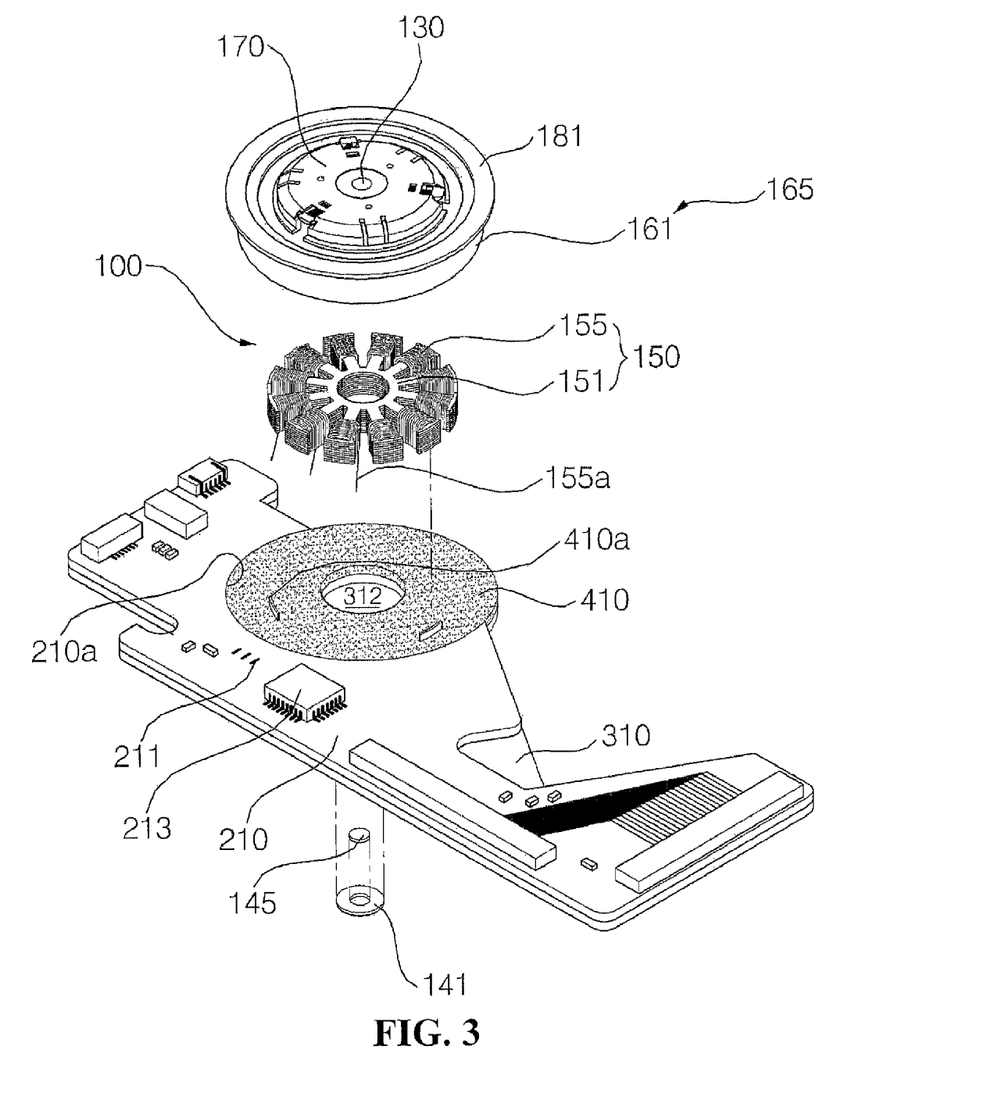
FIG. 3 is a perspective view illustrating a spindle motor structure of FIG. 2.

FIG. 2 is a cross-sectional view illustrating a spindle motor and a printed circuit board according to a first exemplary embodiment of the present disclosure, and FIG. 3 is a perspective view illustrating a spindle motor structure of FIG. 2.

Referring to FIGS. 2 and 3, a spindle motor 100 and a driving printed circuit board (substrate 210) are coupled to a metallic base 310.

Hereinafter, in the description of directions and surfaces of constituent elements including the base 310, a surface and a direction facing a vertical upper side of the base 310 are referred to as 'upper surface and upper side' and a surface and a direction facing a lower side of the base 310 are referred to as 'lower surface and lower side'.

The spindle motor 100 includes a bearing housing 110 which in turn is provided in a cylindrical shape with an open bottom, where a lower end open surface of the bearing housing 120 is insertedly coupled with a coupling hole 312 formed at the base 310.

The bearing housing 110 is press-fitted by a bearing 120 which in turn is rotatably and supportively installed by a lower outer periphery of rotation shaft 130. The opened lower surface of the bearing housing 110 is coupled with a thrust stopper 141 that prevents the rotation shaft 130 from disengaging toward downstream of the bearing housing 110.

A stator 150 has a core 151 coupled to the outer periphery of the bearing housing 110, and a coil 155 wound on the core 151. A rotor 160 includes a rotor yoke 161 supported on the rotation shaft 130 exposed to the outside of the bearing housing 110, and a magnet 165 coupled to the rotor yoke 161 in opposition to the stator 150.

Accordingly, when a current is applied to the coil 155, the rotor 160 and the rotation shaft 130 are rotated through electromagnetic fields formed between the coil 155 and the magnet 165.

The rotor yoke 161 also serves to function as a turn table on which a disk 50 is mounted. A felt 181 is installed at an upper perimeter of the rotor yoke 161 for inhibiting the mounted disk 50 from slipping.

A clamp device 170 elastically supporting the disk 50 and inhibiting the disk 50 from disengaging upward of the rotor yoke 161 is installed on the outer perimeter of the rotor yoke 161 coupled to the rotation shaft 130, in order to align the center of the mounted disk 50 with the center of the rotation shaft 130. The coil 155 of the spindle motor 100 is connected to the driving substrate 210 to receive an external electric power.

The present exemplary embodiment of the present invention is so provided as to easily connect the coil 155 of the spindle motor 100 and the driving substrate 210, which is described in the following.

Referring to FIGS. 2 and 3, the driving substrate 210 is provided at the outer periphery of the rotor yoke 161 and is coupled at the lower surface thereof to an upper surface of the base 310 using an adhesive or a two-sided tape.

To this end, an area of the driving substrate 210 corresponding to an upper surface area of the base 310 for mounting the rotor yoke 161 is formed thereinside with a sink 210a. The driving substrate 210 is formed with a connection pattern 211 to which a lead wire 155a of the coil 155 is connected using solder, and is also installed with a plurality of circuit parts including a driving integrate circuit (IC. 213) and the like.

An adhesive 410 is coated on an upper surface of the base 310 inside the rotor yoke 161. The adhesive 410 supports one side of the core 151 and simultaneously insulates the metallic base 310 and the coil 155. An area of the adhesive 410 for supporting the core 151 is formed with a protrusion 410a toward the core 151 side.

In the first exemplary embodiment of the present invention, the driving substrate 210 is aligned at the outer periphery of the spindle motor 100 to enable the lead wire 155a of the coil 155 to be easily connected to the driving substrate 210.

In a case of separating the driving substrate 210 and the spindle motor 100 for replacing the driving substrate 210, the only procedure is to simply detach the lead wire 155a of the coil 155 from the driving substrate 210.

Unexplained reference numeral 145 in FIGS. 2 and 3 defines a thrust plate for inhibiting the rotation shaft 130 and the thrust stopper 141 from being worn out by supporting the lower portion of the rotation shaft 130.

Now, a second exemplary embodiment of the present invention will be described.

Figure 4:
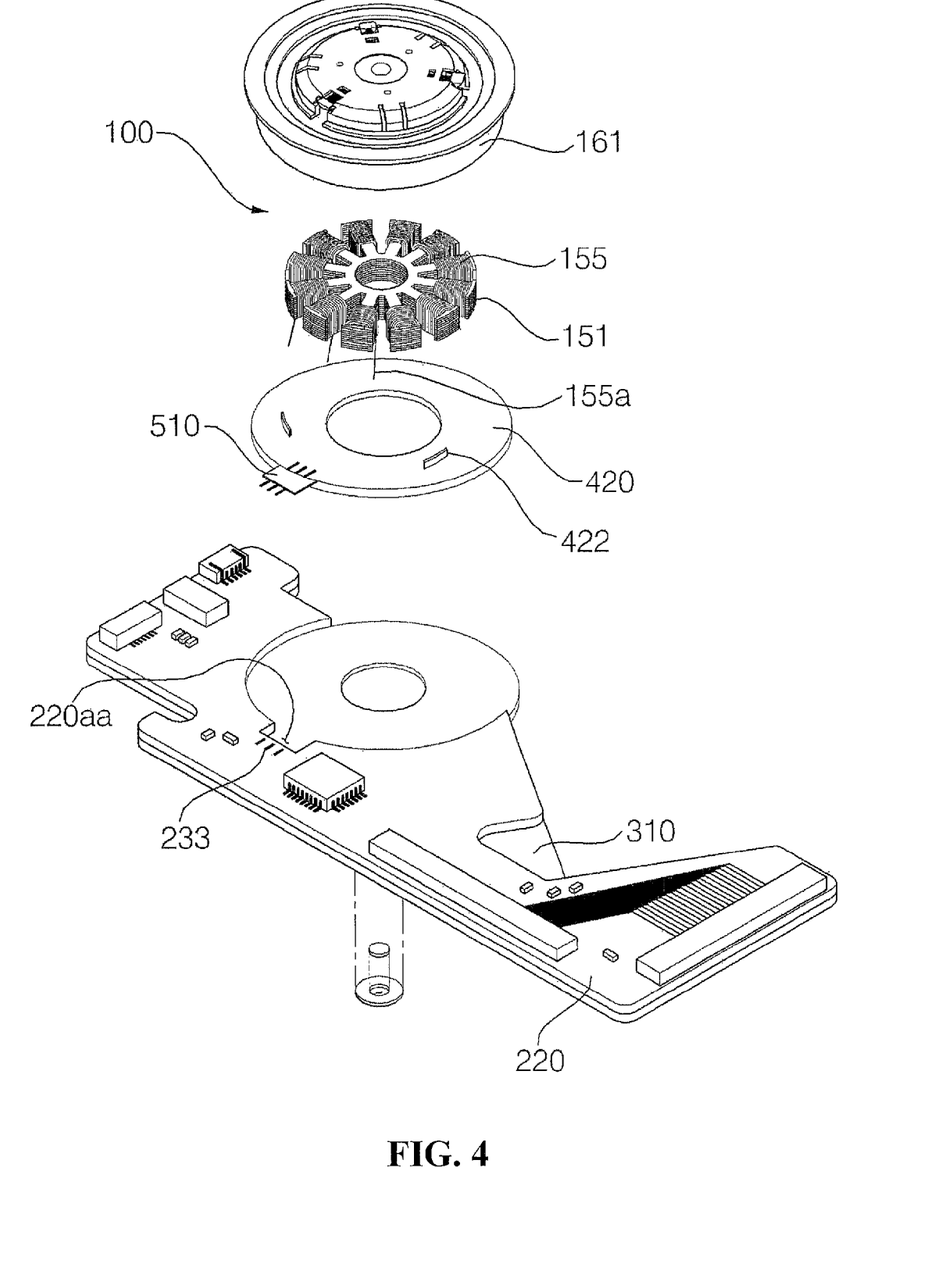
FIG. 4 is a perspective view illustrating a spindle motor structure according to a second exemplary embodiment of the present disclosure.

FIG. 4 is a perspective view illustrating a spindle motor structure according to a second exemplary embodiment of the present disclosure, from which a structure alone which is different from that of the first exemplary embodiment will be described.

Referring to FIG. 4, an upper surface of the base 310 inside the rotor yoke 161 is coupled to the lower surface of a core substrate 420 using an adhesive or a two-sided tape. The core substrate 420 serves to insulate the metallic base 310 and the coil 155, and to support one side of the core 151. The core 151 is supported at one side thereof by the core substrate 420 by a solder 422.

The coil 155 and a driving substrate 220 are interconnected via a flexible flat cable 510, an electric line or other electrically connecting means.

To be more specific, one side of the flexible flat cable 510 is fixedly coupled to the core substrate 420 to allow the lead wire 155a of the coil 155 being connected using solder, while the other side of the flexible flat cable 510 is exposed to the outside of the rotor yoke 161 to be connected using solder to a connection pattern 223 formed at the driving substrate 220.

A tip end of the driving substrate 220 formed at the connection pattern 223 is formed with a support groove 220aa into which a center of the flexible flat cable 510 is supportively inserted, in order to facilitate the soldering of the flexible flat cable 510 and the driving substrate 220.

When the driving substrate 220 and the core substrate 420 are coupled to the base 310, an upper surface of the driving substrate 220 and an upper surface of the core substrate 420 may be positioned on the same planar surface, in order to facilitate the soldering of the flexible flat cable 510 and the driving substrate 220.

In the second exemplary embodiment of the present invention, the driving substrate 220 is arranged on an outer periphery of the spindle motor 100, and an area of the flexible flat cable 510 connected to the driving substrate 220 is exposed outside of the rotor yoke 161. Accordingly, it is easy to connect the flexible flat cable 510 to the driving substrate 220 and to separate the driving substrate 220 from the flexible flat cable 510. A flexible substrate may be used instead of the flexible flat cable 510.

Now, a third exemplary embodiment of the present invention will be described.

Figure 5:
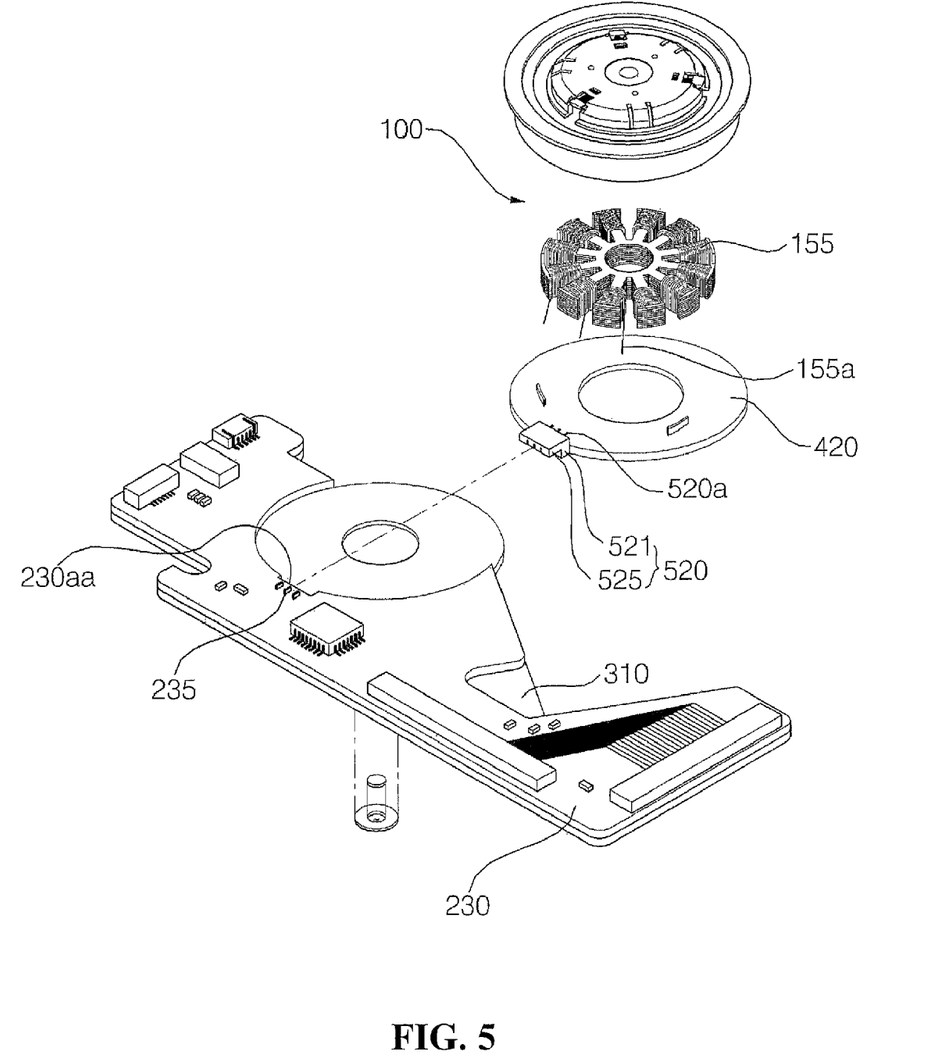
FIG. 5 is a perspective view illustrating a spindle motor structure according to a third exemplary embodiment of the present disclosure.

FIG. 5 is a perspective view illustrating a spindle motor structure according to a third exemplary embodiment of the present disclosure, from which a structure alone which is different from that of the second exemplary embodiment will be described.

Referring to FIG. 5, a core substrate 420 coupled to an upper surface of the base 310 is connected to a connector 520. The connector 520 includes a coupling unit 521 coupled to an outer periphery of the core substrate 420, and a support unit 525 bent from an upper end of the coupling unit 521 toward a driving substrate 230 side.

The support unit 525 is embedded with a connection terminal 520a, and one side of the connection terminal 520a is exposed toward the core substrate 420 side, where the lead wire 155a of the coil 155 is connected using solder. The driving substrate 230 is formed with a connection terminal 235 inserted into the other side of the connector 520 and connected to the connection terminal 520a. A tip end of the driving substrate 230 formed with the connection terminal 235 is formed with a support groove 230aa into which the support unit 525 of the connector 520 is supportively inserted.

In the third exemplary embodiment of the present invention, the driving substrate 230 is arranged on an outer periphery of the spindle motor 100, and an area of the connector 520 connected to the driving substrate 230 is exposed outside of the rotor yoke 161. Accordingly, it is easy to connect the connector 520 to the driving substrate 230 and to separate the driving substrate 220 from the connector 520.

Now, a fourth exemplary embodiment of the present invention will be described.

Figure 6:
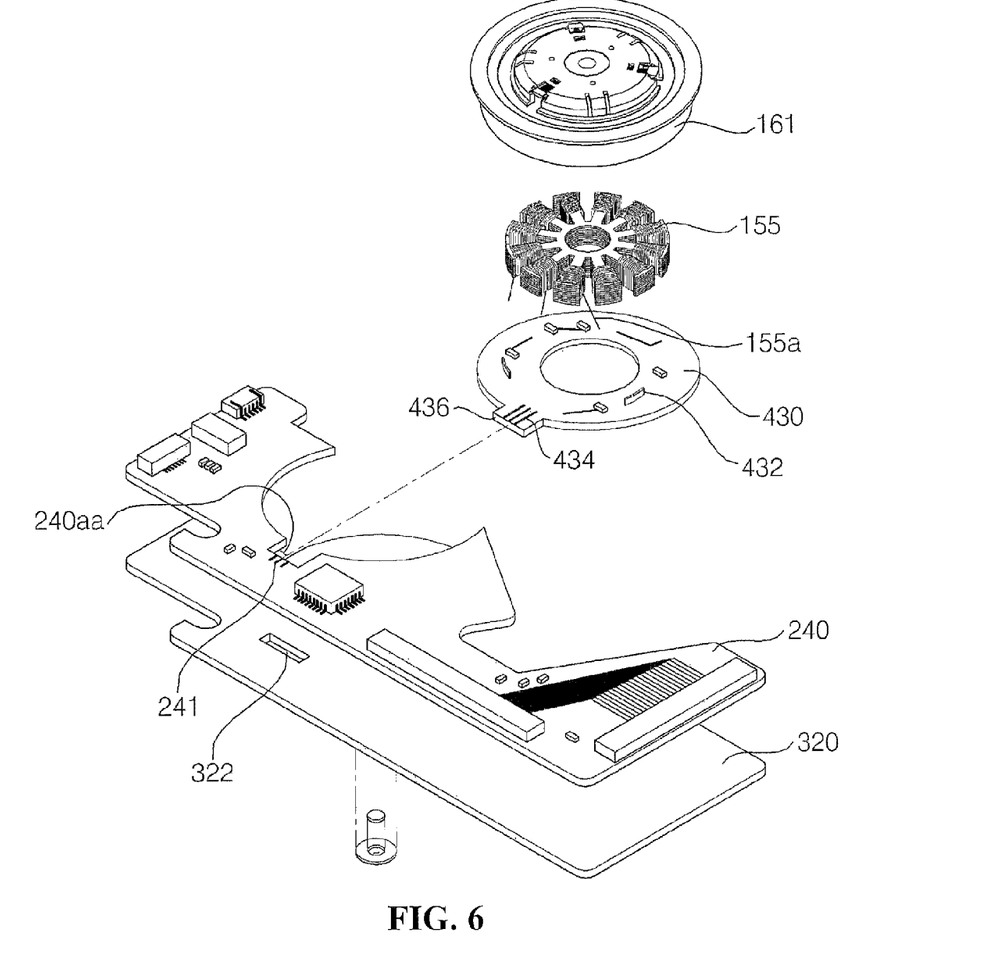
FIG. 6 is a perspective view illustrating a spindle motor structure according to a fourth exemplary embodiment of the present disclosure.

FIG. 6 is a perspective view illustrating a spindle motor structure according to a fourth exemplary embodiment of the present disclosure, from which a structure alone which is different from that of the third exemplary embodiment will be described.

Referring to FIG. 6, an upper surface of a base 320 inside the rotor yoke 161 is coupled to the lower surface of a core substrate 430 using an adhesive or a two-sided tape. The core substrate 430 serves to insulate the metallic base 310 and the coil 155, and to support one side of the core 151. The core 151 is supported at one side thereof by the core substrate 430 by a solder 432.

The core substrate 430 is connected to a substrate 24. To this end, the core substrate 430 and the driving substrate 240 are respectively connected to a connection pattern 434 and an access pattern 241, where the connection pattern 434 is connected to a lead wire 155a of the coil 155 by a soldering process.

The connection pattern 434 is formed at an upper surface of a protruding piece 436 protruding outside from an outer periphery of the core substrate 430, and a tip end of a driving substrate 240 formed with the connection pattern 241 is formed with a support groove 240aa into which the protruding piece 436 is supportively inserted, in order to facilitate the connection between the connection pattern 434 and the access pattern 241.

When the core substrate 430 and the driving substrate 240 are coupled to a base 320, an upper surface of the core substrate 430 and an upper surface of the driving substrate 240 may be positioned on the same planar surface, in order to facilitate the connection of the connection pattern 434 and the access pattern 241.

A gap may exist between a tip end of the protruding piece 436 and that of the driving substrate 240 when the protruding piece 436 is inserted into the support groove 240aa. If the solder that has been introduced into the gap exceeds more than a predetermined amount, the solder may flow backward to an upper surface of the protruding piece 436 and to that of the driving substrate 240 to flow over the upper surface of the protruding piece 436 and that of the driving substrate 240. This may cause generation of short-circuit.

In order to inhibit the backward flow of the solder, a discharge hole 322 is formed at an area between the connection pattern 434 and the access pattern 241, i.e., an area of the base 320 corresponding to a gap between a tip end of the protruding piece 436 and a cross-section of the driving substrate 240. As a result, the solder that has introduced into the gap comes into the discharge hole 322 to be attached to the discharge hole 322 by tension, or to be discharged outside via the discharge hole 322, thereby inhibiting the generation of short-circuit.

In the fourth exemplary embodiment of the present invention, the driving substrate 240 is arranged on an outer periphery of the spindle motor 100, and an area of the connection pattern 434 of the core substrate 430 connected to the driving substrate 240 is exposed outside of the rotor yoke 161. Accordingly, it is easy to connect the core substrate 430 to the driving substrate 220 and to separate the driving substrate 240 from the core substrate 430.

In the spindle motor structure according to the present invention, a substrate is arranged on an outer periphery of a rotor of the spindle motor, and an area connected to a coil of the spindle motor is exposed outside of the spindle motor to be connected to the substrate. Accordingly, it is easy to connect the spindle motor to the substrate and to separate the substrate from the spindle motor, whereby only the substrate may be replaced to standardize and common-use the spindle motor.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A spindle motor structure comprising:
 a spindle motor including a stator having a core wound with a coil and a rotor rotating about the stator; and
 a driving substrate aligned at an outer periphery of the rotor such that the rotor and the stator are within an inner periphery of the driving substrate and soldered with driving control parts of the spindle motor including a plurality of circuit parts including a driving integrated circuit; and
 a base on which the spindle motor and the driving substrate are installed,
 wherein the spindle motor is assembled with or dissembled from the base independently from the driving substrate.

2. The structure of claim 1, wherein an area of the base inside the rotor is coated with an adhesive supporting the core and is simultaneously insulated from the coil and the base.

3. The structure of claim 2, wherein the driving substrate is formed with an access pattern to which the coil is connected by a soldering process.

4. A spindle motor structure comprising:
 a spindle motor including a stator having a core wound with a coil and a rotor rotating about the stator;
 a driving substrate aligned at an outer periphery of the rotor and soldered with driving control parts of the spindle motor including a plurality of circuit parts including a driving integrated circuit;
 a core substrate aligned at an inner side of the rotor and installed with the core and to which the coil is soldered and connected to the driving substrate; and
 a base on which the spindle motor, the driving substrate and the core substrate are installed, wherein the spindle motor or the core substrate is assembled with or dissembled from the base independently from the driving substrate.

5. The structure of claim 4, comprising a flexible flat cable or a flexible printed circuit board, wherein one side of the flexible flat cable or the flexible printed circuit board is fixedly coupled to the core substrate to be connected to the coil, while the other side of the flexible flat cable or the flexible printed circuit board is exposed to the outside of the rotor to be connected to the driving substrate.

6. The structure of claim 5, wherein the driving substrate is formed with an access pattern connected to the other side of the flexible flat cable or a flexible printed circuit board by a soldering process.

7. The structure of claim 6, wherein a tip end of the driving substrate formed with the access pattern is formed with a support groove into which the flexible flat cable or the flexible printed circuit board is supportively inserted.

8. The structure of claim 4, comprising a connector, wherein one side of the connector is fixedly coupled to the core substrate to be connected to the coil, while the other side is exposed to the outside of the rotor to be connected to the driving substrate.

9. The structure of claim 8, wherein the driving substrate is formed with an access terminal insertedly connected to the other side of the connector.

10. The structure of claim 8, wherein the connector includes a coupling unit coupled to an outer periphery of the core substrate, and a support unit bent from an upper end of the coupling unit and embedded with the coil and a connection terminal connected to the driving substrate.

11. The structure of claim 10, wherein the driving substrate is formed with a support groove insertedly supported by the support unit.

12. The structure of claim 4, wherein one side of the core is supported by the core substrate by a soldering process and the core substrate is coupled to the base via an adhesive or a two-sided tape.

13. The structure of claim 4, wherein one side of the driving substrate is provided with a support groove formed with an access pattern, one side of the core substrate is provided with a connection pattern connected to the access pattern by a soldering process, and with a protruding piece insertedly supported by the support groove, and a discharge hole is formed at an area of the base corresponding to an area between the connection pattern and the access pattern.

14. A spindle motor structure comprising:
a base;
a spindle motor installed on the base including a rotation shaft, a rotor simultaneously rotating with the rotation shaft, a core fixed between the rotation shaft and the rotor and a stator having a coil wound on the core and rotating the rotor;
a core substrate connected with the coil by being installed at an area of the base inside the rotor for insulating the coil and the base; and
a driving substrate installed on the base at an outer periphery of the rotor and connected to the core substrate by a soldering process,
wherein the area of the base corresponding to an area between the core substrate and the driving substrate is formed with a discharge hole for inhibiting a solder from flowing backward.

15. The structure of claim 14, wherein the core substrate and the driving substrate are respectively formed with an access pattern and a connection pattern each connected by soldering, the connection pattern is connected to the coil, and the discharge hole is formed at an area between the connection pattern and the access pattern.

16. The structure of claim 15, wherein one side of the driving substrate is formed with a support groove, one side of the core substrate is formed with a protruding piece insertedly supported by the support groove, and the access pattern is formed at the side of the support groove, and the connection pattern is formed at the protruding piece.

17. The structure of claim 16, wherein one side of the core is supported by the core substrate by a soldering process.

* * * * *